N. CONSTANTINE.
POT AND PAN LIFTER.
APPLICATION FILED MAY 24, 1913.
1,143,253.
Patented June 15, 1915.
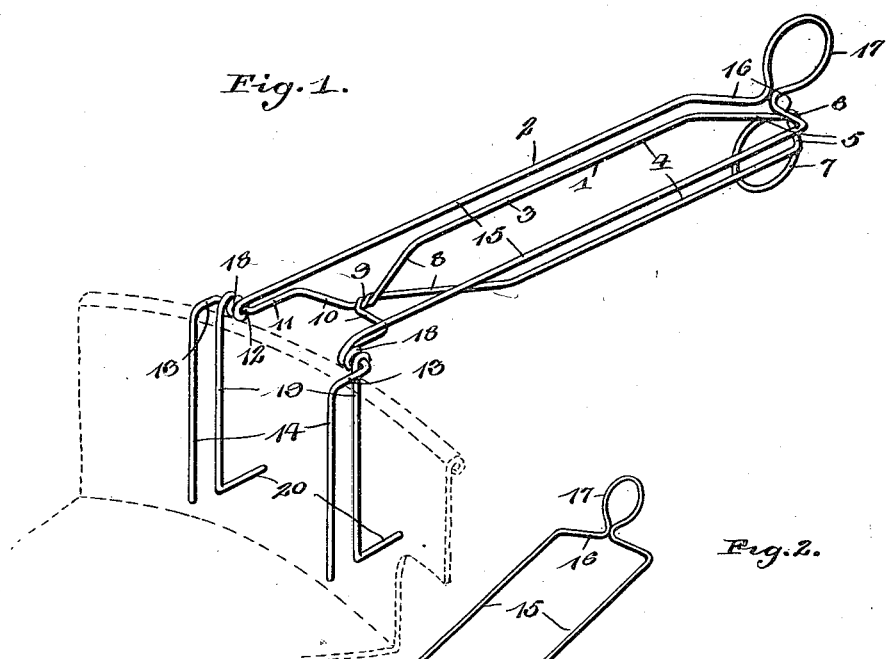
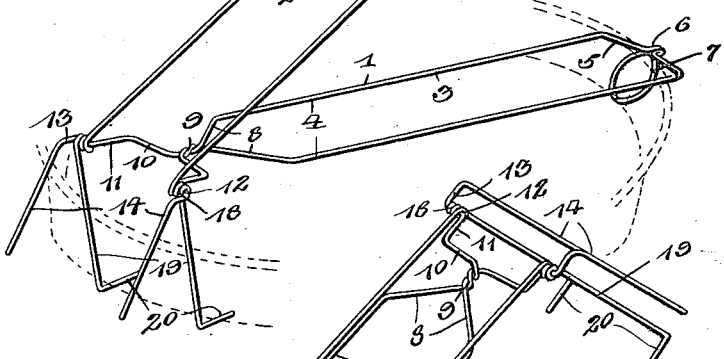
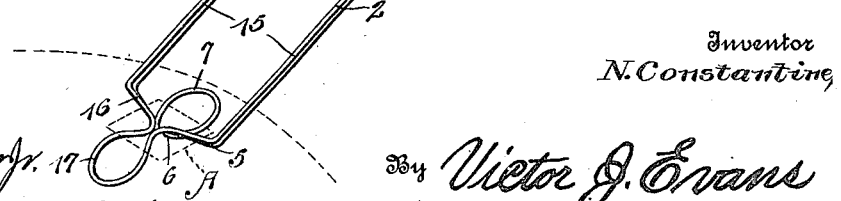
Inventor
N. Constantine,
Witnesses
By Victor J. Evans
Attorney

UNITED STATES PATENT OFFICE.

NICOLAE CONSTANTINE, OF INDIANA HARBOR, INDIANA.

POT AND PAN LIFTER.

1,143,253.  Specification of Letters Patent.  Patented June 15, 1915.

Application filed May 24, 1913. Serial No. 769,648.

*To all whom it may concern:*

Be it known that I, NICOLAE CONSTANTINE, a citizen of the United States, residing at Indiana Harbor, in the county of Lake and State of Indiana, have invented new and useful Improvements in Pot and Pan Lifters, of which the following is a specification.

This invention relates to pot and pan lifters and has for its primary object the provision of a device of this character which will embody coöperating clamping or gripping elements that may be associated with the utensil in such manner that the same may be lifted without burning the hands.

A still further object of the invention is the provision of coöperating elements of a lifter of this character which may be made to embrace external surfaces of the utensil so that the weight of the utensil against the coöperating members will tend to move the members with relation to each other to thereby maximize the gripping efficiency of the members, positively preventing the utensil from slipping while being carried.

Further objects of the invention will appear as the following description is read in connection with the accompanying drawing, which forms a part of this application, and in which:—

Figure 1 is a perspective view of the device showing the companion gripping members embracing the utensil at one side of the latter. Fig. 2 is a similar view showing the application of companion members of the device engaging a slightly different form of utensil and disposed with portions at diametrically opposite points thereon. Fig. 3 is a perspective view showing the manner in which the device may be used as a stove lifter.

The device is shown to include mating or coöperating elements 1 and 2, the former being constructed preferably from a single length of wire bent upon itself in its main length to provide a handle 3 having parallel sides 4 which are connected with each other at one end of the handle by branches 5 that are extended laterally, as at 6, into a hook 7, the latter being disposed substantially at an obtuse angle to the plane of the handle 3, as clearly shown. At the opposite end the sides 4 are extended toward each other, as at 8, and they are then extended forwardly and intertwisted with each other, as at 9, and they are afterward bent laterally at 10 in opposite directions from each other and then forwardly at 11 and then laterally again at 12 and then forwardly at 13 and downwardly so as to provide relatively long gripping arms 14. The other member 2 of the device is also constructed from a single length of wire bent in its main length to provide parallel sides 15 that are connected with each other by lateral branches 16 which extend into the sides of a hook 17. The hook 17 is arranged substantially at an obtuse angle to the plane of the sides 15 and is adapted to lie substantially in the same general plane with the hook 7 of the member 2 when the latter is closed against the member 1 and the device used as a stove lifter, as illustrated in Fig. 3. At the opposite ends the sides 15 are provided with many lateral convolutions 18 forming eyes which receive the lateral portions 12 of the member 2. The outer convolutions are extended into angularly disposed gripping arms 19 which are similar to the arms 14 of the member 2 which are adapted to coöperate therewith, as will be hereinafter explained. The eye forming convolutions 18 of the member 1, when engaged with the portions 12 of the member 2 are directly interposed between the branches 11 and 13, as clearly shown, so that said branches form stops which will positively prevent lateral derangement of the sides of the member 1 from the member 2, as will be obviously understood. The free ends of the arms 19 are bent angularly, as at 20, as shown.

When using the device for gripping a utensil such as the one shown in Fig. 1 the handle portions of both members are moved manually to open position. The gripping arms 14 of the member 1 are then extended into the utensil while the arms 19 of the member 2 are arranged exteriorly thereof and disposed with such regard to the arms 14 that the latter will coact with the former so as to properly impinge against the sides of the utensil when the handle portions of the members 1 and 2 are closed against each other and the parts gripped in the hands of the operator when carrying the utensil from one place to another.

When using the device for carrying pie pans the angularly bent portions 20 of the member 2 are extended beneath the flange of the pan, as shown in Fig. 2, at one side of the pan, while the hook 7 of the member 1 is engaged beneath the flange of the pan at the opposite side thereof. The handle portion of the member 2 is then located above the pan and is free to be grasped by the hand of the operator and to be lifted so that the weight of the pan and its contents will automatically draw the portions 7 and 20 into secure gripping engagement with the rim of the pan.

When using the device as a stove lifter the hook 17 of the member 1 is inserted into the recess A of the lid while the hook 7 of the other member of the plate is disposed directly against the lid at one side of the recess so as to brace the connection of the device with the lid and positively prevent the hook 17 from being casually deranged from the recess when the lid is lifted.

What is claimed is:—

The herein described combined pot and pan lifter and lid lifter comprising a pair of members pivotally connected together and having gripping arms at their pivotal ends, one of said members having an outwardly extending projection at its outer end and the other having an inwardly extending projection at its outer end, the gripping arms of the first named member having terminal portions at their outer ends extending toward the inturned projection of the other member.

In testimony whereof I affix my signature in presence of two witnesses.

NICK. CONSTANTINE.

Witnesses:
Wm. C. Hughes,
Chas. W. Rajchinetz,

Copies of this patent may be obtained for five cents each, by addressing the "Commissioner of Patents, Washington, D. C."